US006235423B1

(12) United States Patent
Lake

(10) Patent No.: US 6,235,423 B1
(45) Date of Patent: *May 22, 2001

(54) BUTTON-TYPE BATTERIES WITH AN INSULATING JACKET

(75) Inventor: Rickie C. Lake, Eagle, ID (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/249,739

(22) Filed: Feb. 11, 1999

Related U.S. Application Data

(62) Division of application No. 08/953,812, filed on Oct. 20, 1997, now abandoned.

(51) Int. Cl.[7] ........................................................ H01M 2/08
(52) U.S. Cl. ........................... 429/174; 429/177; 429/185
(58) Field of Search ..................................... 429/174, 177, 429/164, 185

(56) References Cited

U.S. PATENT DOCUMENTS

Re. 35,746 * 3/1998 Lake .
2,178,969 * 11/1939 Ruben .
3,655,455    4/1972 Jones .
3,935,026 * 1/1976 Howard .
4,087,595 * 5/1978 Mallery et al. .
4,258,108 * 3/1981 Glaser .
5,270,133   12/1993 Baumann, III .

OTHER PUBLICATIONS

Linnen, David. *Handbook of Batteries*, McGraw–Hm, Inc., 2nd Ed., USA, pp. 12–14, 1995 (No Month).*

* cited by examiner

*Primary Examiner*—John S. Maples
(74) *Attorney, Agent, or Firm*—Wells, St. John, Roberts, Gregory & Matkin, P.S.

(57) ABSTRACT

Methods of insulating batteries, and in particular thin-profile batteries comprising button-type batteries and resultant insulated battery constructions are described. In one aspect, a flowable insulating material is distributed over an edge region of a battery and subsequently provided into a generally non-flowable state. In one implementation, the battery is rotated while the flowable material is provided over the edge region. Provision of the flowable material over the edge region can comprise dipping the edge region into a volume of flowable material or dispensing a desired amount of flowable material over the edge region. In another implementation, an insulating jacket is provided over the battery having a minimum thickness of no greater than about 2 mils.

22 Claims, 10 Drawing Sheets

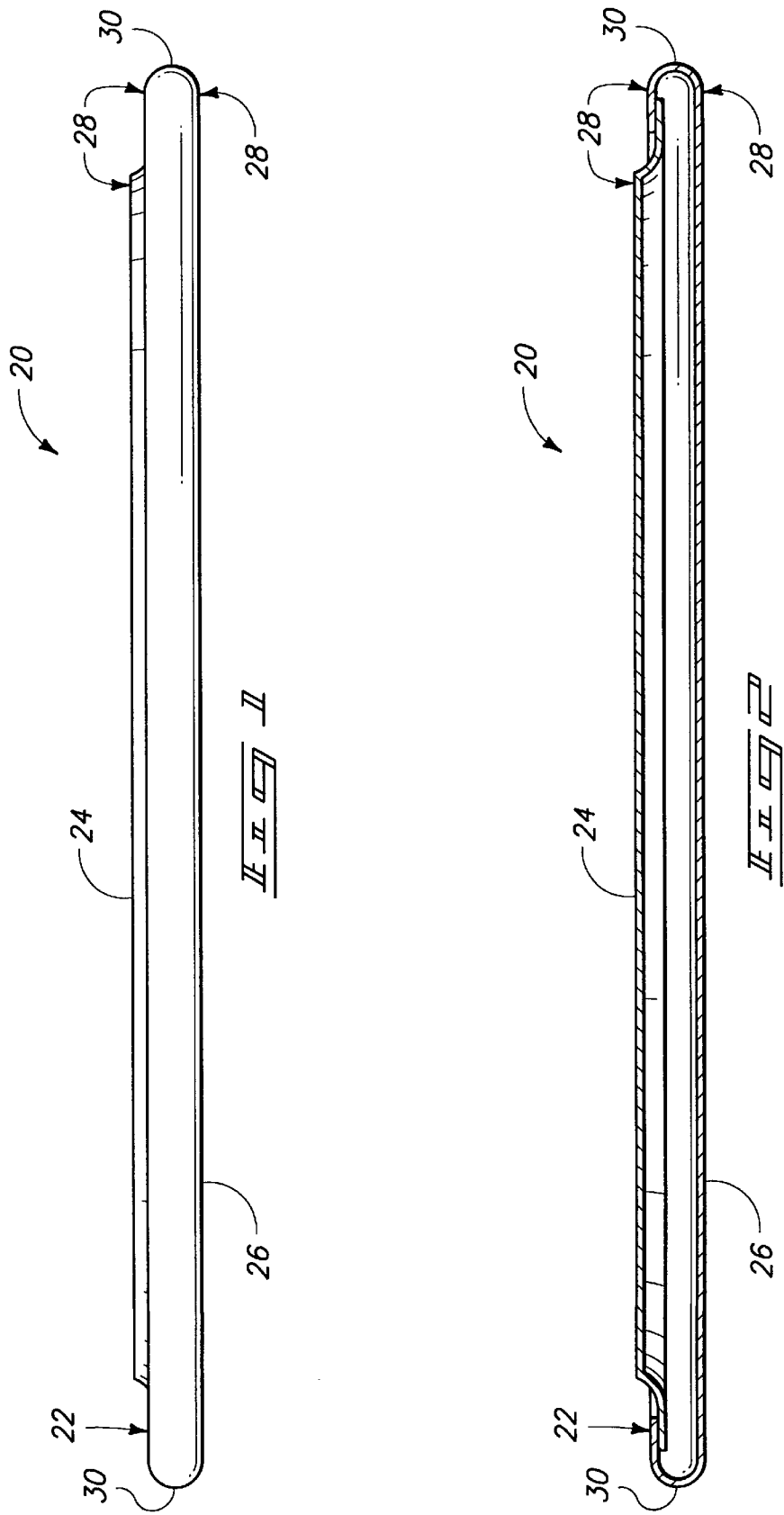

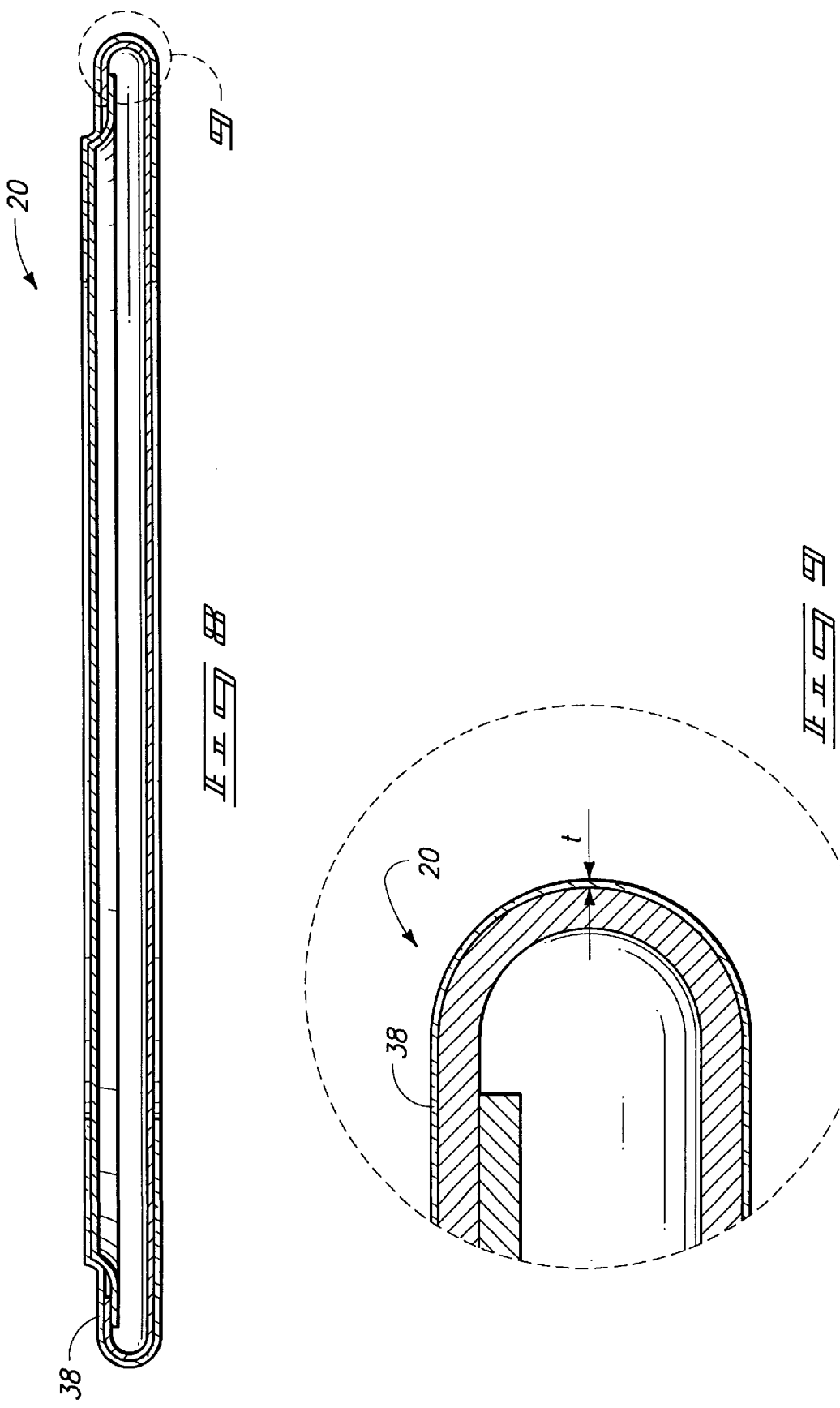

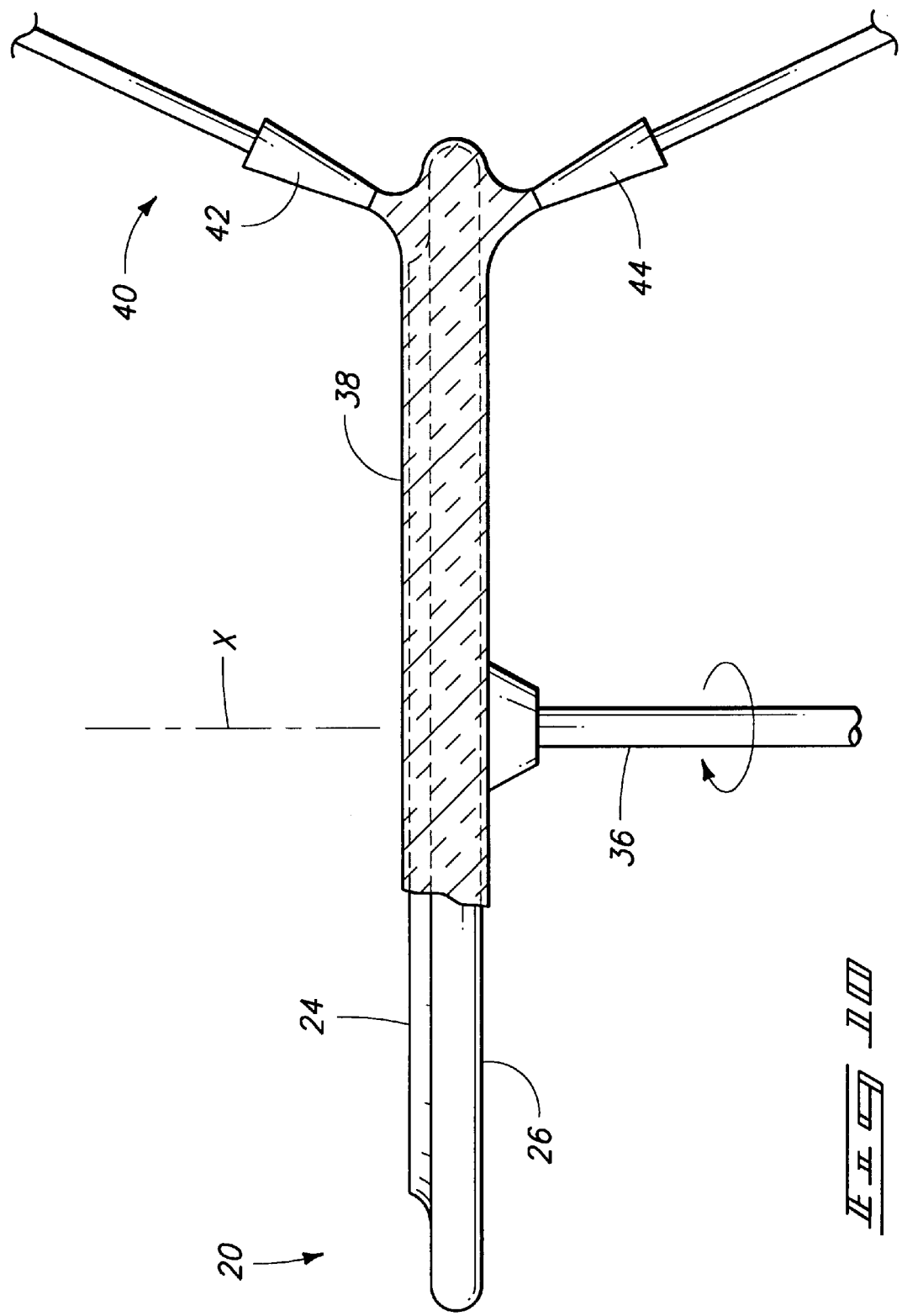

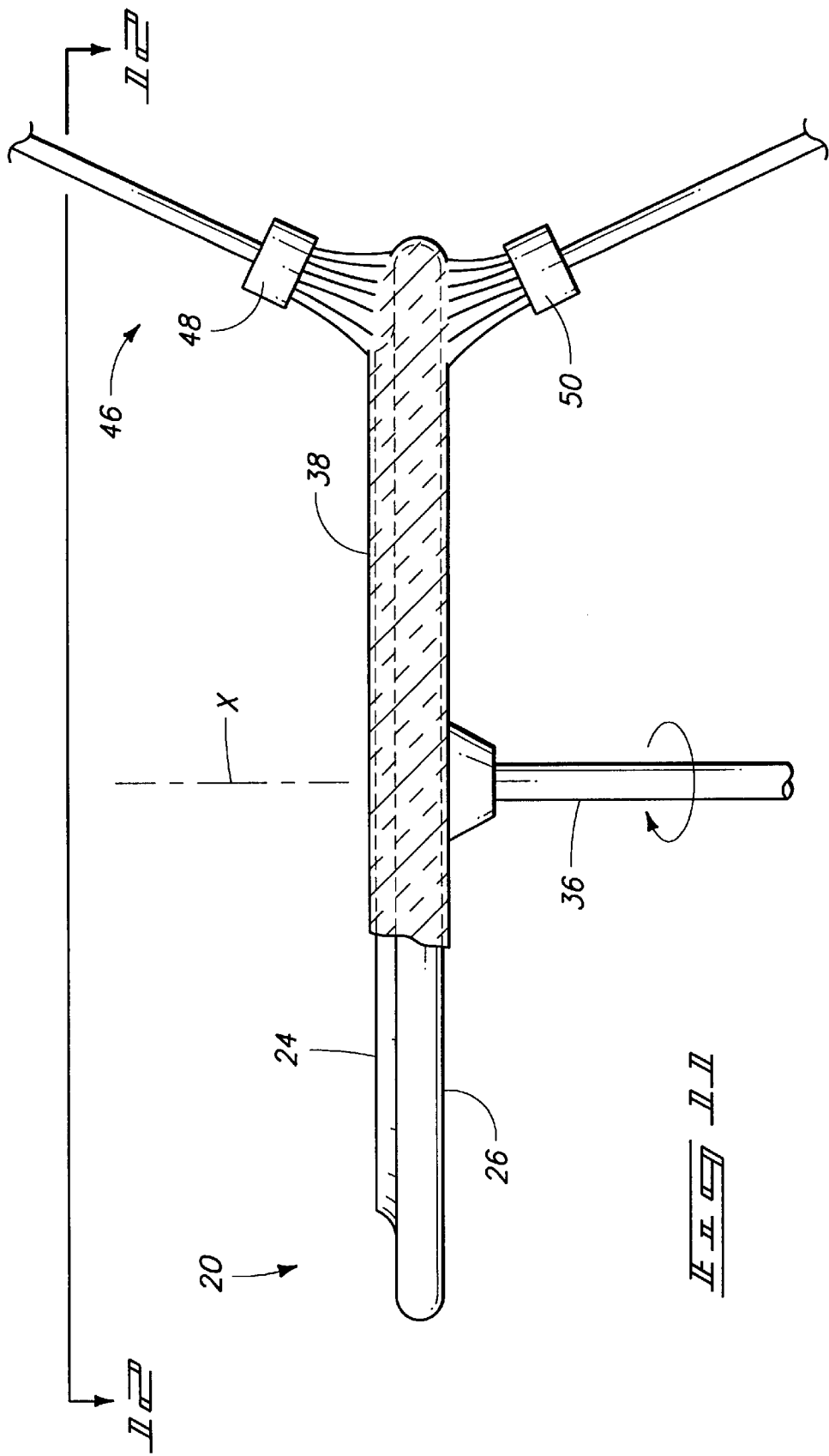

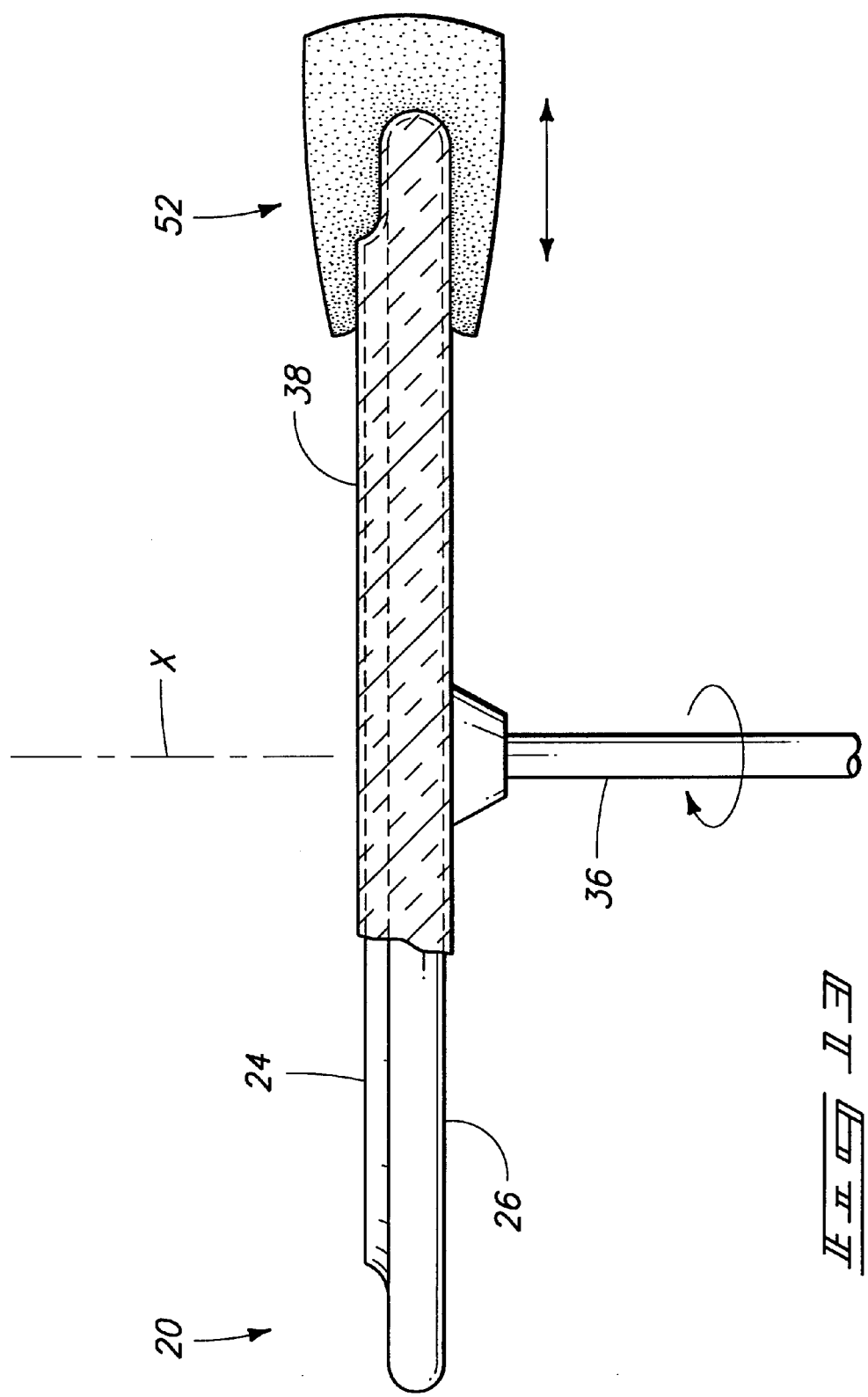

BUTTON-TYPE BATTERIES WITH AN INSULATING JACKET

RELATED PATENT DATA

This patent resulted from a divisional application of U.S. patent application Ser. No. 08/953,812, filed Oct. 20, 1997, entitled "Methods of Insulating Batteries, Thin-Profile Batteries, and Button-Type Batteries, and Battery Constructions", naming Rickie C. Lake as inventor, and which is now abandoned.

TECHNICAL FIELD

This invention relates to methods of insulating batteries, and in particular to methods of insulating thin-profile batteries comprising button-type batteries. The invention also relates to insulated batteries, and in particular insulated thin-profile batteries comprising button-type batteries.

BACKGROUND OF THE INVENTION

Thin-profile batteries are characterized by having thickness dimensions which are less than a maximum linear dimension of its anode or cathode. One type of thin-profile battery is a button-type battery. Such batteries, because of their compact size, permit electronic devices to be built which themselves are very small or compact. One concern associated with such thin-profile batteries pertains to protecting the batteries from becoming grounded to one another or to other structures comprising a device in which such battery or batteries are incorporated.

This invention arose out of concerns associated with providing methods of insulating batteries, and in particular button-type batteries, and resultant battery constructions which improve upon currently employed methodologies and constructions.

SUMMARY OF THE INVENTION

Methods of insulating batteries, and in particular thin-profile batteries comprising button-type batteries and resultant insulated battery constructions are described. In one aspect, a flowable insulating material is distributed over an edge region of a battery and subsequently provided into a generally non-flowable state. In one implementation, the battery is rotated while the flowable material is provided over the edge region. Provision of the flowable material over the edge region can comprise dipping the edge region into a volume of flowable material or dispensing a desired amount of flowable material over the edge region. In another implementation, an insulating jacket is provided over the battery having a minimum thickness of no greater than about 2 mils.

BRIEF DESCRIPTION OF THE DRAWINGS

Preferred embodiments of the invention are described below with reference to the following accompanying drawings.

FIG. 1 is a side elevation of a thin-profile battery comprising a button-type battery.

FIG. 2 is a side sectional view of the FIG. 1 battery.

FIG. 8 is a view of the FIG. 1 battery at a different processing point.

FIG. 9 is an enlarged view of a portion of FIG. 8.

FIG. 10 is a side elevation of a thin-profile battery undergoing processing in accordance with another aspect of the invention.

FIG. 11 is a side elevation of a thin-profile battery undergoing processing in accordance with another aspect of the invention.

FIG. 13 is a side elevation of a thin-profile battery undergoing processing in accordance with another aspect of the invention.

DETAILED DESCRIPTION OF THE PREFERRED EMBODIMENTS

Figure 3:
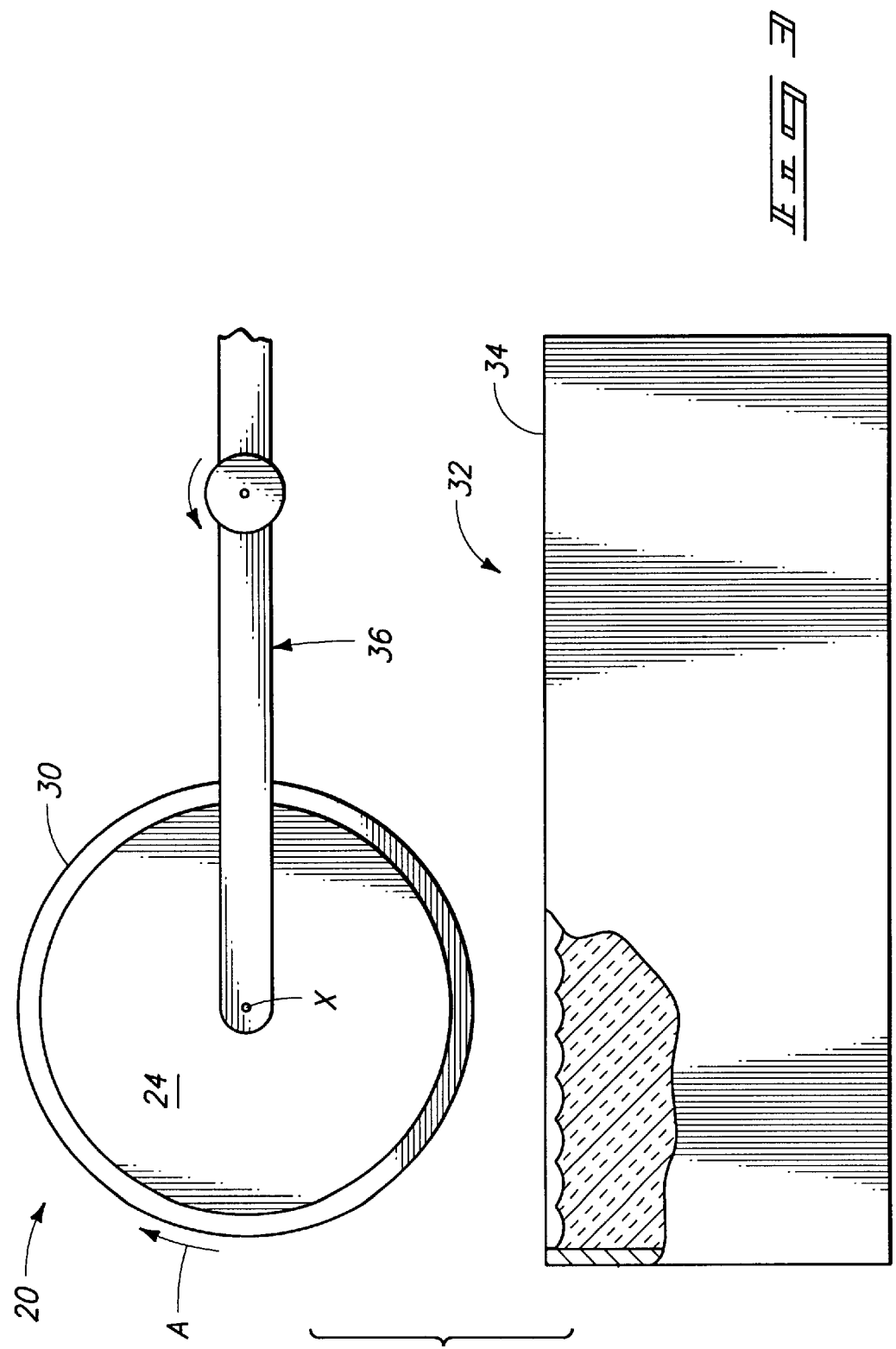
FIG. 3 is a side view of a thin-profile battery undergoing processing in accordance with one aspect of the invention.

This disclosure of the invention is submitted in furtherance of the constitutional purposes of the U.S. Patent Laws "to promote the progress of science and useful arts" (Article 1, Section 8).

Referring to FIGS. 1 and 2, a battery is shown generally at 20. In the illustrated example, battery 20 is a thin-profile battery comprising a button-type battery. Battery 20 comprises a pair of terminal housing members which define in part an outer conductive surface 22 of the battery. Surface 22 comprises first and second respective outwardly-facing electrode surfaces 24, 26 which are defined in part by the different respective terminal housing members. Where battery 20 comprises a button-type battery, electrode surface 24 defines a lid electrode and electrode surface 26 defines a can electrode.

Battery 20 also includes an edge region 28 which can include portions of one or both electrode surfaces 24, 26. A perimeter edge 30 defines an outermost extent of edge region 28. At least a portion of first and second electrode surfaces 24, 26 are generally planar and are joined or connected proximate edge region 28 and peripheral edge 30 as best shown in FIG. 2. The battery includes an anode and a cathode which are contained inside outer surface 22. The anode is in electrical communication with the lid electrode and the cathode is in electrical communication with the can electrode.

Referring to FIG. 3, a volume of generally flowable insulating material is provided generally at 32 and is contained by a container 34. An example includes "Loctite Shadowcure 394" manufactured by Loctite Corporation of Newington, Conn. An engagement mechanism 36 is provided and suitably engages battery 20. Battery 20 is then rotated about a central axis x which is substantially normal to at least one of the generally planar terminal housing member surfaces. In the example, the battery is rotated in the direction of arrow A.

Figure 4:
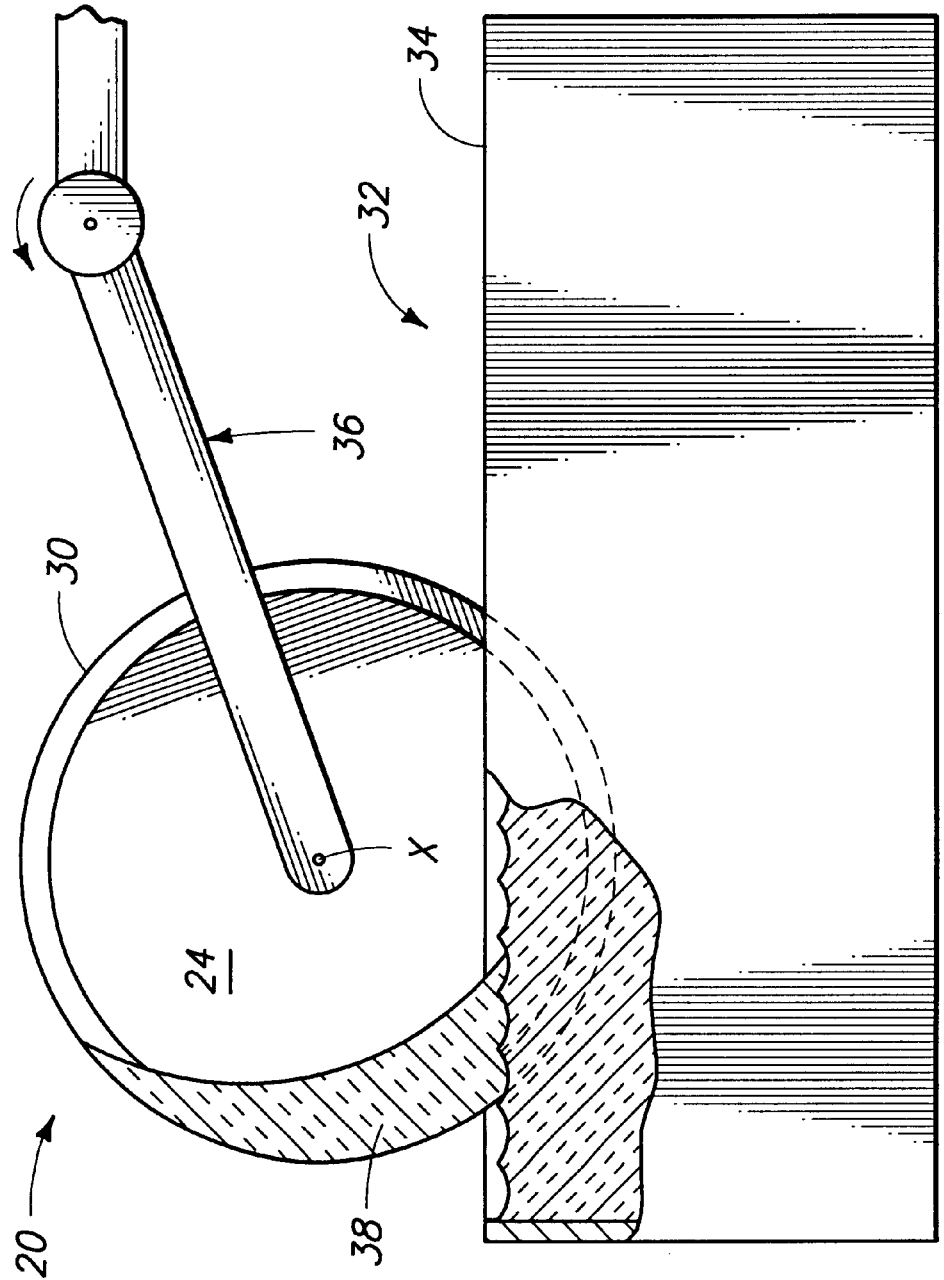
FIG. 4 is a view of the FIG. 3 battery at a different processing point.

Referring to FIG. 4, and while battery 20 is being rotated, engagement mechanism 36 moves the battery into contact with the flowable insulating material 32 within container 34. The battery is moved through the flowable material which forms a coating 38 over at least peripheral edge 30. Coating 38 can be, and preferably is formed over edge region 28 (FIG. 1) of the battery. Accordingly, coating 38 is formed over at least one and preferably both electrode surface portions comprising edge region 28. FIG. 4 shows coating 38 covering only a portion of edge 30 because the battery has not yet been completely rotated about central axis x.

Figure 5:
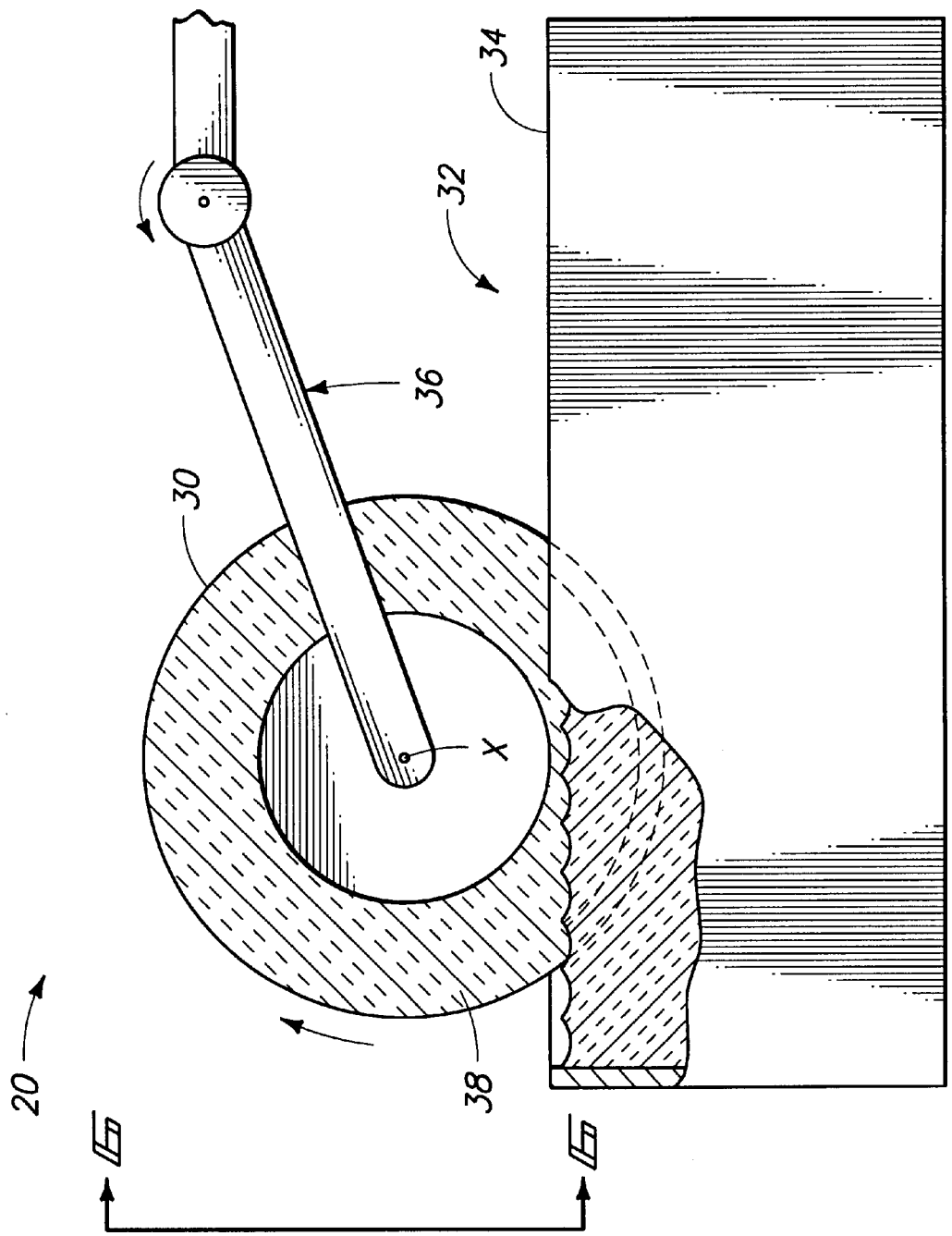
FIG. 5 is a view of the FIG. 3 battery at a different processing point.
Figure 6:
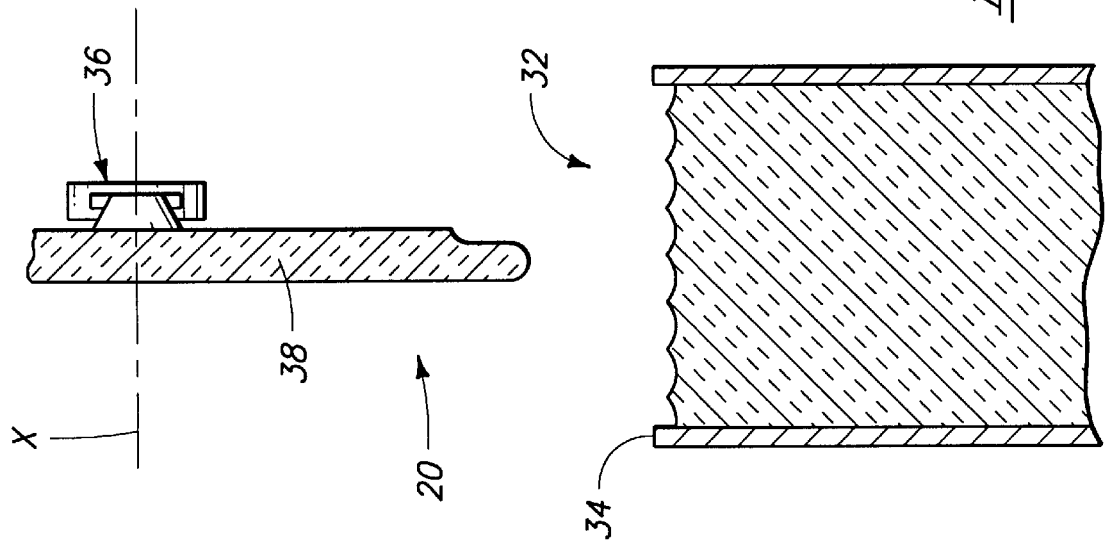
FIG. 6 is a view which is taken along line 6—6 in FIG. 5 with a portion broken away to show detail.

Referring to FIGS. 5 and 6, battery 20 has been moved through the flowable material sufficiently to forming a coating about the entirety of peripheral edge 30. Accordingly, coating 38 is distributed over the region.

Figure 7:
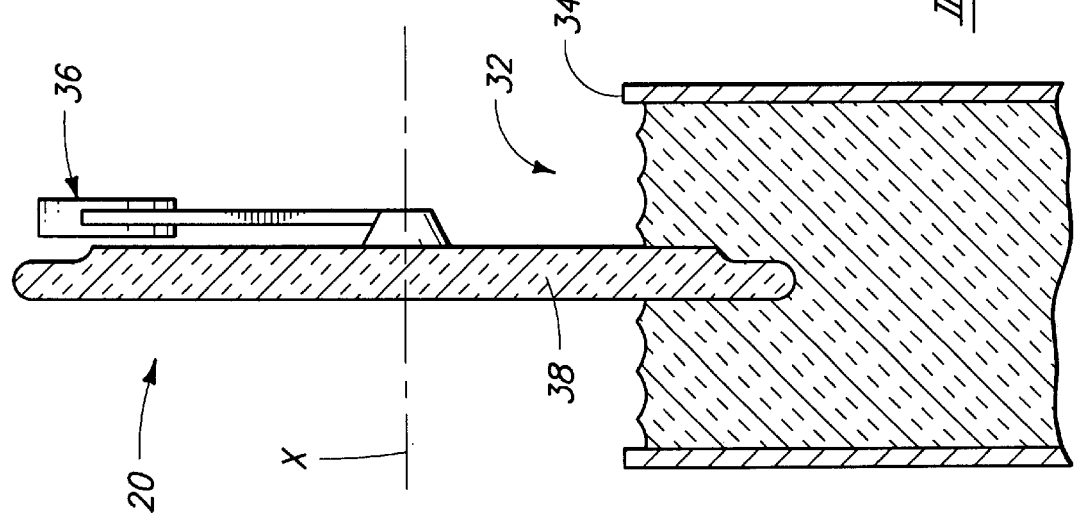
FIG. 7 is a view similar to the FIG. 6 view at a different processing point.

Referring to FIG. 7, engagement mechanism 36 moves battery 20 away from and out of physical contact with flowable insulating material 32. The processing described in connection with FIGS. 3–7 constitutes but one way in which a generally flowable insulating material is distributed over at least a portion of battery 20 by dipping the subject battery portion into a volume of the flowable material.

After provision of the flowable insulating material onto the battery, the battery can be further rotated for a duration which is sufficient to cast undesirable excess flowable material from the battery. In some instances, additional rotation may be desirable to provide a uniformly and thinly distributed layer of insulating material over the battery. Rotation speeds can vary. Accordingly, speeds between 50 to 5000 RPMs are suitable for processing. A lower speed such as one around 72 RPMs is more preferred at least for the initial application of flowable material. The higher speeds are suitable for such additional rotation as may be desired to cast excess material from the battery or to form a thinly distributed layer over the battery.

Referring to FIGS. 8 and 9, the flowable insulating material of coating 38 is exposed to conditions which are effective to render the flowable material into a generally non-flowable state. In the illustrated example, an exemplary insulating material comprises a curable plastic resin. Such conditions might include merely allowing the flowable material, applied at an elevated temperature, to cool at room temperature into a solidified mass. Alternately, heat might be used to cure some systems. Further alternately, ultraviolet curable materials can be utilized so that the non-flowable state is achieved through application of suitable ultraviolet curing conditions. For example, the above-referenced "Loctite Shadowcure 394" material can be rendered into the non-flowable state either thermally or through ultraviolet curing. Other systems, such as epoxy, may only have short working lives whereby chemical curing occurs fairly rapidly at room temperature. Further alternately by way of example only, a reactive gas environment might be utilized to achieve cure. Additionally, a solvent-based system can be utilized whereby solids, such as polymers, may be dissolved in an appropriate solvent to provide a flowable material. After applying such material to a battery as described above and below, the battery can be rotated at a higher RPM to not only cast excess material from the battery, but to expose the coated-on material to evaporation conditions which facilitate evaporation of the solvent. An exemplary material is EPDM rubber dissolved in cyclohexane.

In one aspect, provision of the insulating material into the non-flowable state provides a generally non-flowable covering or insulating jacket having a thickness t of no greater than about 2 mils. More preferably, thickness t is greater than about 0.25 mil and no greater than about 1 mil. In another aspect, the insulating jacket is disposed over at least 60% of the battery conductive outer surface. The insulating jacket can be disposed over more than 70% of the conductive outer surface.

Referring to FIGS. 10–13, alternate implementations are shown in which the generally flowable insulating material is applied or distributed over the battery by various dispensing apparatuses. Battery 20 is engaged with engagement mechanism 36 which rotates the battery about its central axis x. As shown in FIG. 10, a dispensing apparatus 40 comprises at least one and preferably two nozzles 42, 44 which dispense the flowable material onto at least perimeter edge 30 and preferably edge region 28 as the battery rotates. Accordingly, portions of both terminal housing members 24, 26 are coated with the flowable insulating material. The insulating material is subsequently exposed to conditions which are effective to render it into a Generally non-flowable state as discussed above in connection with FIGS. 8 and 9. Thickness and area dimensions are as described above.

Figure 12:
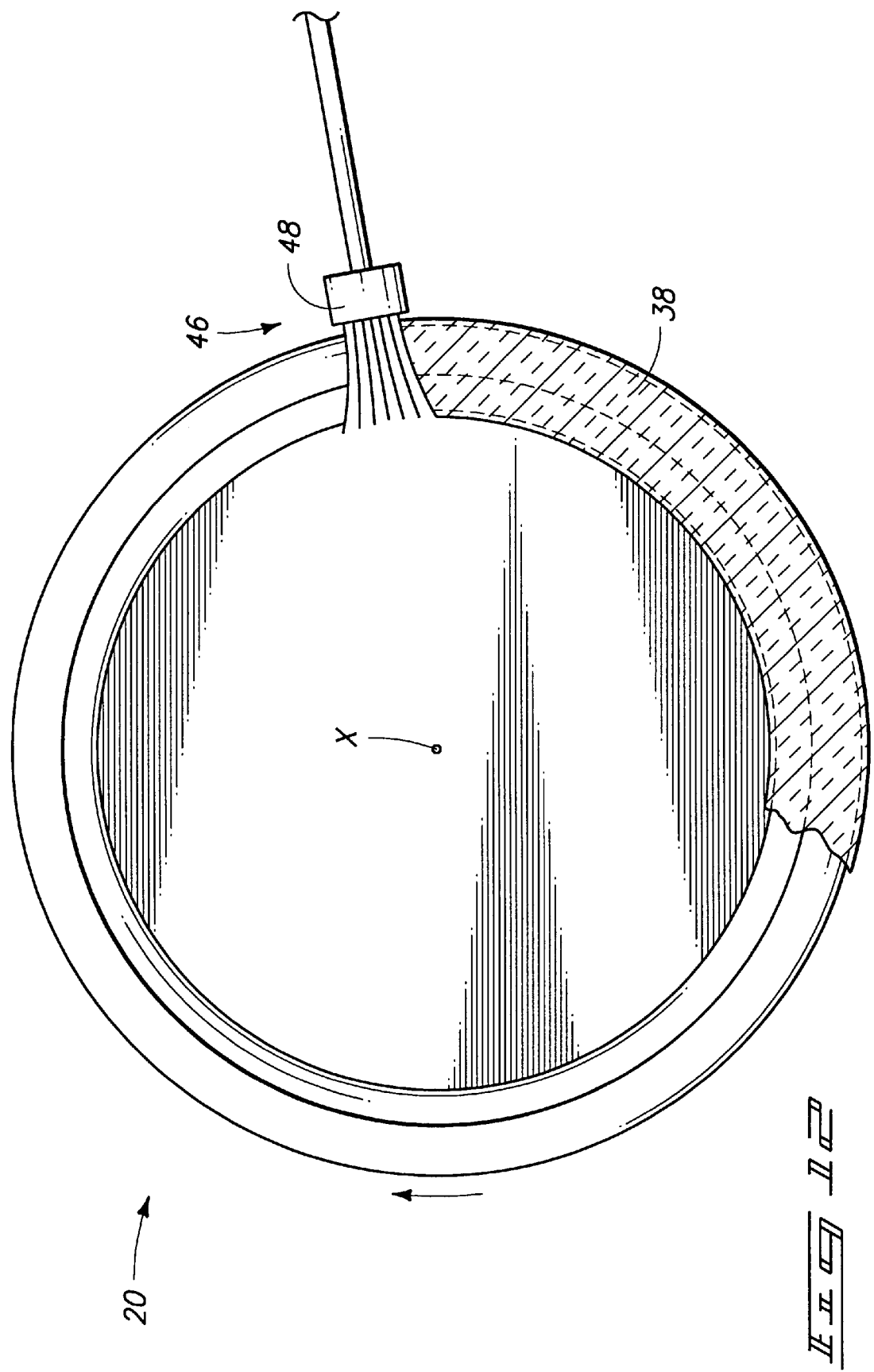
FIG. 12 is a top view of the FIG. 11 thin-profile battery undergoing processing.

Referring to FIGS. 11 and 12, a dispensing apparatus 46 comprises at least one and preferably two brushes 48, 50 respectively, for dispensing the insulating material over battery 20. The brushes engage battery 20 and contain the insulating material such that coating 38 is formed thereover. Subsequent processing is as described above.

Referring to FIG. 13, a dispensing apparatus in the form of a substantially elastic porous mass 52 is provided and contains an amount of insulating material. Mass 52 is generally moved into engagement with battery 20 as the battery is rotated as described above. The battery is received by mass 52 which conformably engages the edge region of the battery as shown. Accordingly, insulating material is provided thereover. Subsequent processing is as described above.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A button-type battery comprising:
    a pair of terminal housing members defining a button-type battery configuration having opposing substantially parallel surfaces and an edge region between the opposing surfaces; and
    an insulating jacket received over substantially an entirety of the edge region intermediate the opposing surfaces and configured to outwardly expose portions of the terminal housing members.

2. The button-type battery of claim 1, wherein a minimum thickness of insulating material of the insulating jacket is no greater than about 1 mil.

3. The button-type battery of claim 1, wherein a minimum thickness of insulating material of the insulating jacket is greater than about 0.25 mil.

4. The button-type battery of claim 1, wherein the edge region comprises a perimeter edge and the insulating jacket is received over the perimeter edge.

5. The button-type battery of claim 1, wherein the edge region comprises at least a portion of both terminal housing members and the insulating jacket is received over both terminal housing member portions.

6. The button-type battery of claim 1, wherein the insulating jacket is configured to extend over portions of the opposing surfaces of the terminal housing members.

7. The button-type battery of claim 1, wherein the terminal housing members individually define a conductive surface.

8. The button-type battery of claim 1, wherein the terminal housing members individually have a dimension greater than a thickness of the button-type battery configuration.

9. A button-type battery comprising:

an outer conductive surface comprising opposing substantially parallel first and second surfaces of a button-type battery, the outer conductive surface defining, at least in part, an enclosure for containing an anode and a cathode each of which being in operative electrical communication with a respective one of the first and second surfaces, the outer conductive surface including a perimeter edge intermediate the opposing first and second surfaces; and an insulative covering disposed over less than an entirety of the outer conductive surface and configured to cover substantially the entire perimeter edge intermediate the opposing first and second surfaces.

10. The button-type battery of claim 9, wherein the insulative covering has a thickness of no greater than about 2 mils.

11. The button-type battery of claim 9, wherein the insulating jacket extends over portions of the opposing first and second surfaces.

12. The button-type battery of claim 9, wherein the insulating jacket has a thickness of no greater than about 1 mil.

13. The button-type battery of claim 9, wherein the opposing first and second surfaces individually have a dimension greater than a thickness of the button-type battery.

14. A button-type battery comprising:

an outer conductive surface comprising first and second surfaces of the button-type battery, the outer conductive surface defining an enclosure for containing an anode and a cathode each of which being in operative electrical communication with a respective one of the first and second surfaces, the outer conductive surface defining a button-type battery surface area; and an insulative covering disposed over at least 60% of the button-type battery surface area and configured to outwardly expose portions of the outer conductive surface.

15. The button-type battery of claim 14, wherein said covering is disposed over more than 70% of the battery surface area.

16. The button-type battery of claim 14, wherein the outer conductive surface comprises a perimeter edge, said covering being disposed over substantially an entirety of said perimeter edge intermediate the first and second surfaces.

17. The button-type battery of claim 14, wherein the insulative covering is disposed over at least portions of the first and second surfaces.

18. The button-type battery of claim 14, wherein the first and second surfaces individually have a dimension greater than a thickness of the button-type battery.

19. A button-type battery, comprising:

an outer conductive surface comprising opposing substantially parallel first and second surfaces of the button-type battery, the outer conductive surface defining an enclosure for containing an anode and a cathode each of which being in operative electrical communication with a respective one of the first and second surfaces; and an insulative covering disposed over some portions of the opposing first and second surfaces and configured to outwardly expose other portions of the opposing first and second surfaces.

20. The button-type battery of claim 19, wherein the covering is disposed over portions of the first and the second surfaces.

21. The button-type battery of claim 19, wherein the outer conductive surface comprises a perimeter edge, the covering being disposed over substantially an entirety of the perimeter edge intermediate the opposing first and second surfaces.

22. The button-type battery of claim 19, wherein the opposing first and second surfaces individually have a dimension greater than a thickness of the button-type battery.

* * * * *

UNITED STATES PATENT AND TRADEMARK OFFICE
CERTIFICATE OF CORRECTION

PATENT NO. : 6,235,423 B1
DATED : May 22, 2001
INVENTOR(S) : Rickie C. Lake

It is certified that error appears in the above-identified patent and that said Letters Patent is hereby corrected as shown below:

Column 3,
Line 7, please insert -- edge -- before "region".

Column 4,
Line 10, please replace "Generally" with -- generally --.
Line 45, please replace "an" with -- the --.

Signed and Sealed this

Thirteenth Day of November, 2001

*Attest:*

*Attesting Officer*

NICHOLAS P. GODICI
*Acting Director of the United States Patent and Trademark Office*